(12) United States Patent
Mui et al.

(10) Patent No.: US 9,277,071 B2
(45) Date of Patent: Mar. 1, 2016

(54) SCANNER PLATEN

(75) Inventors: Paul K Mui, Boise, ID (US); Dean J. Richtsmeier, Boise, ID (US); Jeffrey D. Rutland, Eagle, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/374,358

(22) PCT Filed: Apr. 26, 2012

(86) PCT No.: PCT/US2012/035139
§ 371 (c)(1),
(2), (4) Date: Jul. 24, 2014

(87) PCT Pub. No.: WO2013/162562
PCT Pub. Date: Oct. 31, 2013

(65) Prior Publication Data
US 2014/0340722 A1   Nov. 20, 2014

(51) Int. Cl.
*H04N 1/04* (2006.01)
*H04N 1/00* (2006.01)
*H04N 1/10* (2006.01)

(52) U.S. Cl.
CPC ......... *H04N 1/00551* (2013.01); *H04N 1/1013* (2013.01); *H04N 1/1065* (2013.01)

(58) Field of Classification Search
CPC   H04N 1/00551; H04N 1/1065; H04N 1/1013
USPC .................................. 358/497, 498, 474, 496
See application file for complete search history.

(56) References Cited

U.S. PATENT DOCUMENTS

| | | | |
|---|---|---|---|
| 5,187,588 A | 2/1993 | Stemmle | |
| 5,973,797 A * | 10/1999 | Tanaka et al. | 358/488 |
| 6,628,433 B1 | 9/2003 | Westcott et al. | |
| 6,661,537 B1 * | 12/2003 | Khovaylo | H04N 1/00554 358/474 |
| 7,099,618 B2 | 8/2006 | Iwago et al. | |
| 7,139,108 B2 | 11/2006 | Andersen et al. | |
| 7,924,480 B2 * | 4/2011 | Iwaki et al. | 358/488 |
| 2007/0247681 A1 * | 10/2007 | Klassen | H04N 1/00002 358/532 |
| 2007/0285739 A1 | 12/2007 | Nakano et al. | |
| 2008/0158619 A1 | 7/2008 | Osakabe et al. | |
| 2008/0180758 A1 | 7/2008 | Hall | |
| 2008/0316549 A1 | 12/2008 | Bush, III et al. | |
| 2009/0231642 A1 | 9/2009 | Torimaru et al. | |
| 2010/0060931 A1 * | 3/2010 | Ichikawa et al. | 358/1.15 |
| 2011/0157666 A1 | 6/2011 | Hirokawa et al. | |

OTHER PUBLICATIONS

International Searching Authority, The International Search Report and the Written Opinion, Dec. 6, 2012. International Application No. PCT/US2012/035139.

* cited by examiner

*Primary Examiner* — Houshang Safaipour
(74) *Attorney, Agent, or Firm* — Fabian VanCott

(57) ABSTRACT

A scanner is disclosed. The scanner has a platen with at least one edge of the platen uncovered.

19 Claims, 6 Drawing Sheets

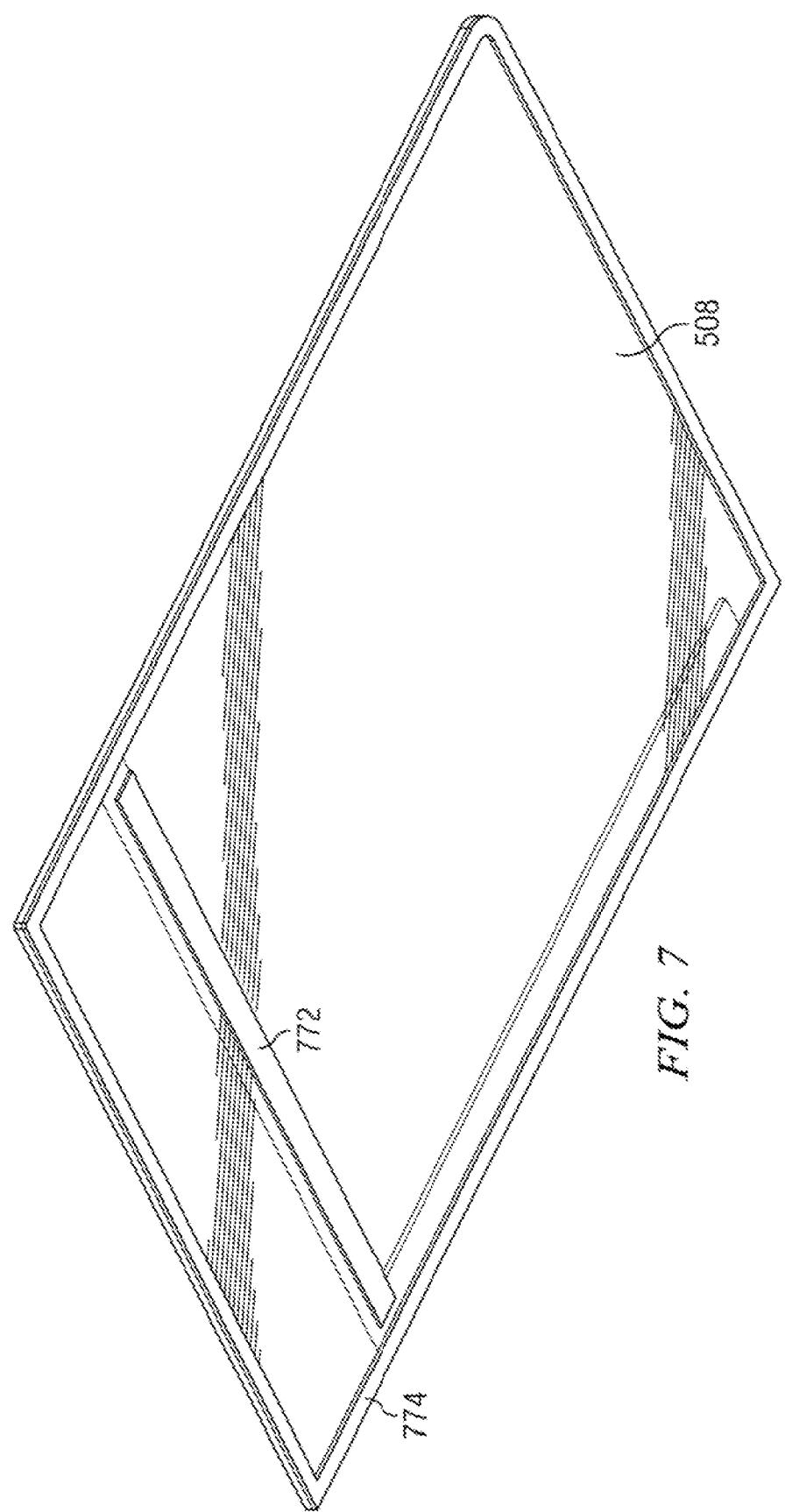

SCANNER PLATEN

BACKGROUND

Scanners come in a variety of types. Sheet-feed scanners use an automatic document feeder (ADF) to move media to be scanned past a small scanning window. Flatbed scanners typically have a page sized platen where a user can place the object to be scanned. Once the object is placed on the platen, a scan head moves underneath the platen scanning the media through the platen. Flatbed scanners may also have ADF's that moves the media past a smaller ADF scan window. Both types of scanners (flatbeds and sheet-feeds) can be configured as a standalone device, or may be integrated into a multi-function peripheral (MFP) or copier. Another name for MFP's is all-in-ones.

BRIEF DESCRIPTION OF THE DRAWINGS

FIG. 7 is an isometric bottom view of platen 508 in an example embodiment of the invention.

DETAILED DESCRIPTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
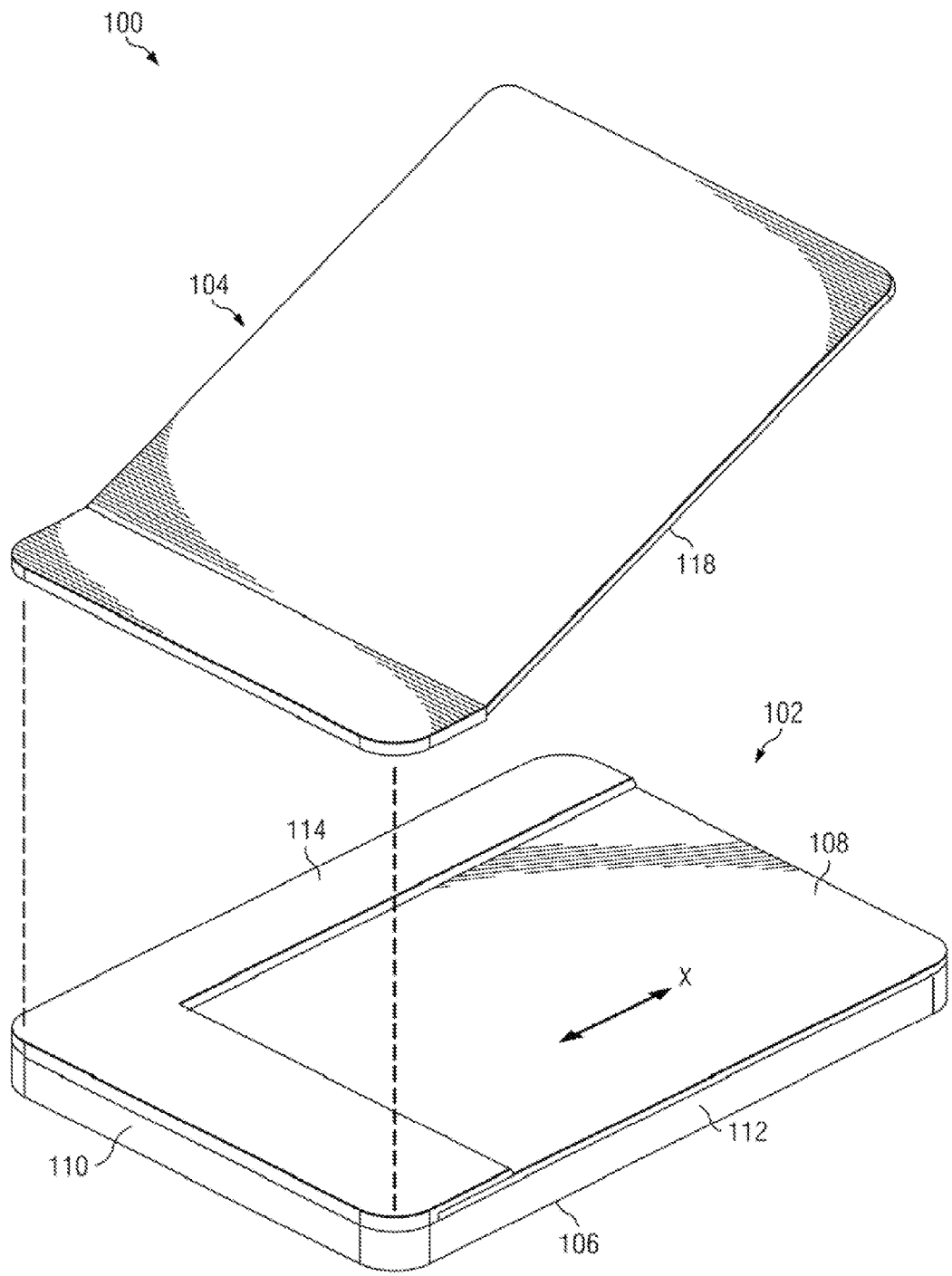
FIG. 1 is an isometric exploded view of scanner 100 in an example embodiment of the invention.

FIG. 1 is an isometric exploded view of scanner 100 in an example embodiment of the invention. Scanner 100 has two main sections, an upper or top section 104, and a lower or bottom section 102. Top section 104 may be as simple as a lid or top cover 118 (as shown) or may comprise an automatic document feeder (ADP) (not shown for clarity). Top cover 118 has an open position and a closed position. Top cover 118, when in the closed position, holds media in a position to be scanned. Top section 104 may couple to bottom section 102 at one end (as shown) or along one side.

Bottom section 102 comprises base 106, platen 108, and top bezel 114. Base 106 is a generally rectangular open topped box forming a cavity. Base 106 has a back side 110, and a front side opposite the back side. The side opposite the hinge on the top cover is typically labeled as the "front" side. Base 106 has a left side 112, and a right side opposite the left side. Base is typically a molded plastic part. A platen is generally a thin rectangular sheet or plate and is made from a transparent material, for example glass or Plexiglas. Platen 108 attaches to the bottom surface of top bezel 114 along one end and one side of platen 108. Together platen 108 and top bezel attach to the top of base 106, thereby closing off the cavity in base 106.

Bottom section 102 may also comprise an optical head or carriage, a drive system to move the carriage in a scanning axis X, electronics to control the scanner, and the like. These items are not shown for clarity.

Figure 2:
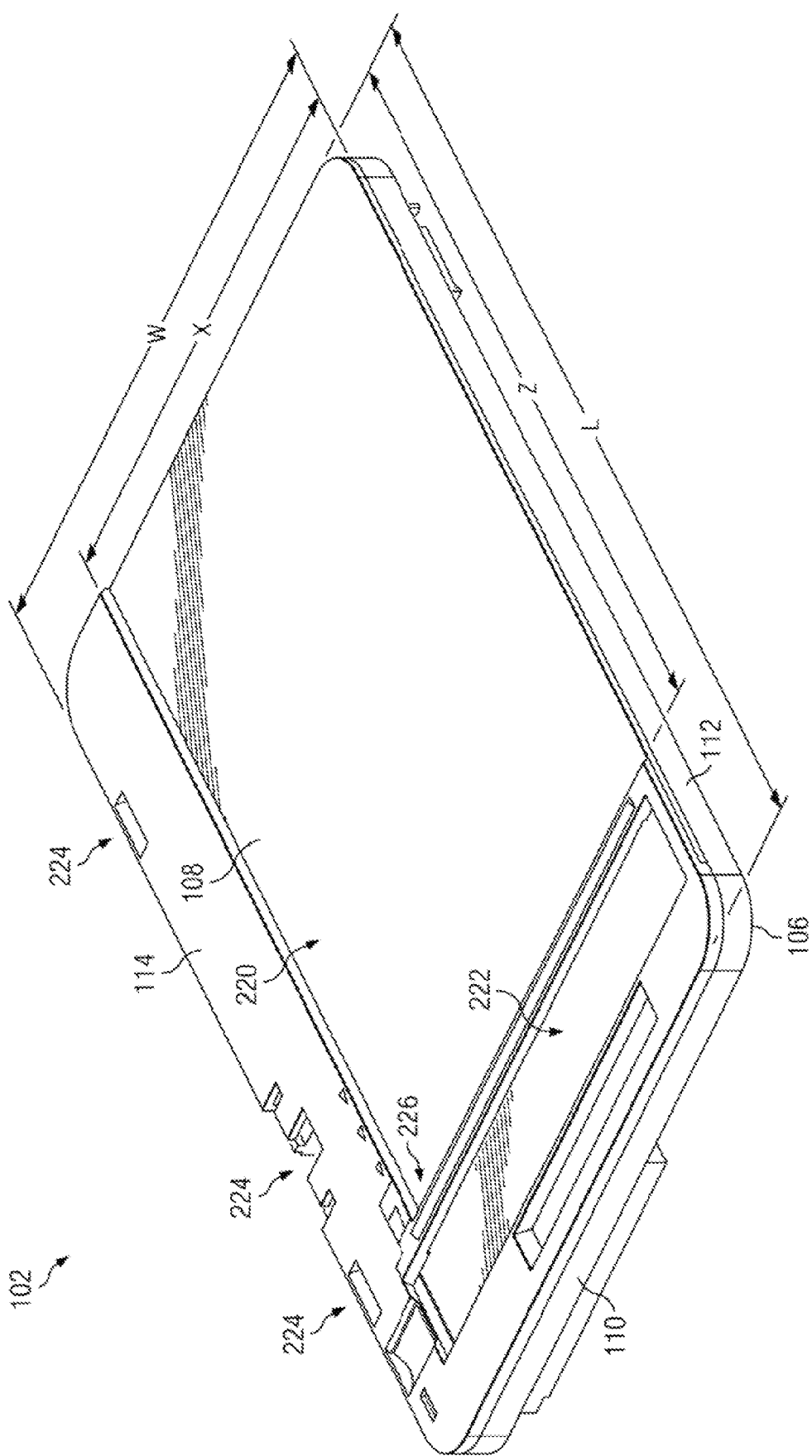
FIG. 2 is an isometric top view of a bottom section 102 of scanner 100 in an example embodiment of the invention.

FIG. 2 is an isometric top view of bottom section 102 of scanner 100 in an example embodiment of the invention. Bottom section 102 comprises base 106, platen 108, and top bezel 114. In this example, the top section (not show for clarity) of the scanner (the top cover or ADF) mounts to the bottom section using mounting features 224. Because the mounting features 224 are on the opposite side from side 112, the hinge for the top side would be opposite side 112. Therefore the "front" side would be side 112, the left side would be side 110, and the right side would be opposite side 110. Top bezel 114 and platen 108 are attached to the top of base 106. Top bezel 114 divides platen 108 into two sections, a flatbed window 220 and an ADF window 222.

Platen 108 attaches to the bottom surface of top bezel 114 along one end and one side of platen 108. Therefore top bezel 114 is on top of, and rises above, the top surface of platen 108. Because top bezel is on top of platen 108, top bezel 114 forms a reference datum 226 in the corner of top bezel 114. The reference datum 226 is used for aligning media onto the flatbed window 220. Media is aligned to the datum 226 by sliding the media along the platen 108 towards the corner in top bezel 114.

Top bezel 114 covers the right edge and the back edge of platen 108. A portion of the front and left sides of platen 108 are not covered by top bezel 114. Base 106 has a width of W. The top surface of the front edge of platen 108 is not covered by top bezel along portion X. Base 106 has a length of L. The top surface of the left side 112 of platen 108 is not covered by top bezel along portion Z. The top surface of platen 108 forms the top surface of bottom section 102 of scanner 100 on both the front and right sides of bottom section (along portions X and Z). Because the top surfaces of two sides of the platen 108 are uncovered along its edges, media can be removed from the scanner by sliding the media directly off the platen 108 away from the top bezel 114.

Figure 3:
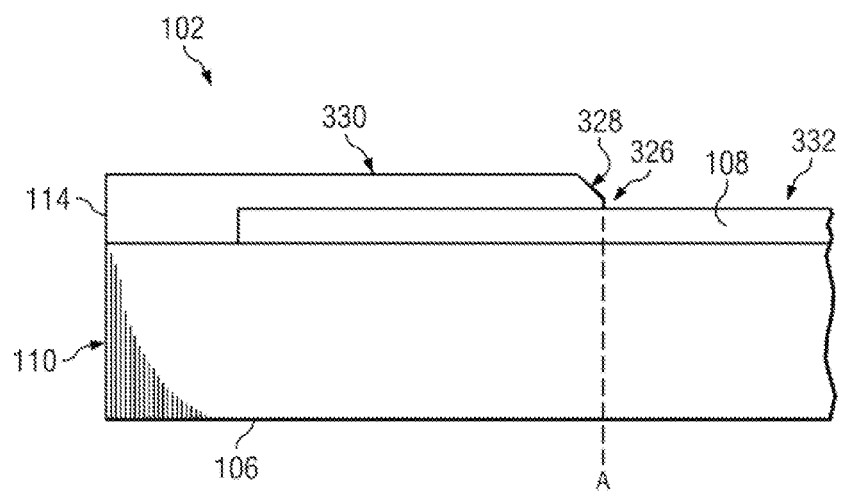
FIG. 3 is a partial side view of a bottom section 102 in an example embodiment of the invention.

FIG. 3 is a partial side view of bottom section 102 in an example embodiment of the invention. Bottom section 102 comprises base 106, platen 108 and top bezel 114. FIG. 3 shows the back part of bottom section 102 near the back side 110 of base 106. Platen 108 is positioned on top of base 106. Top bezel 114 attaches to the top of base 106 along the back side 110 of base 106. Bezel 114 also extends on top of platen 108 until line A. Top bezel 114 has angled face 328 that intersects with platen 108, forming edge 326. Edge 326 forms one side of datum 236 (FIG. 2) and is used to align the front edge of media to the flatbed scan window 220.

Line A is positioned at edge 326. To the left of line A, the top surface 330 of top bezel 114 forms the top surface of bottom section 102 of scanner 100. To the right of line A, the top surface 332 of platen 108 forms the top surface of bottom section 102 of scanner 100.

Figure 4:
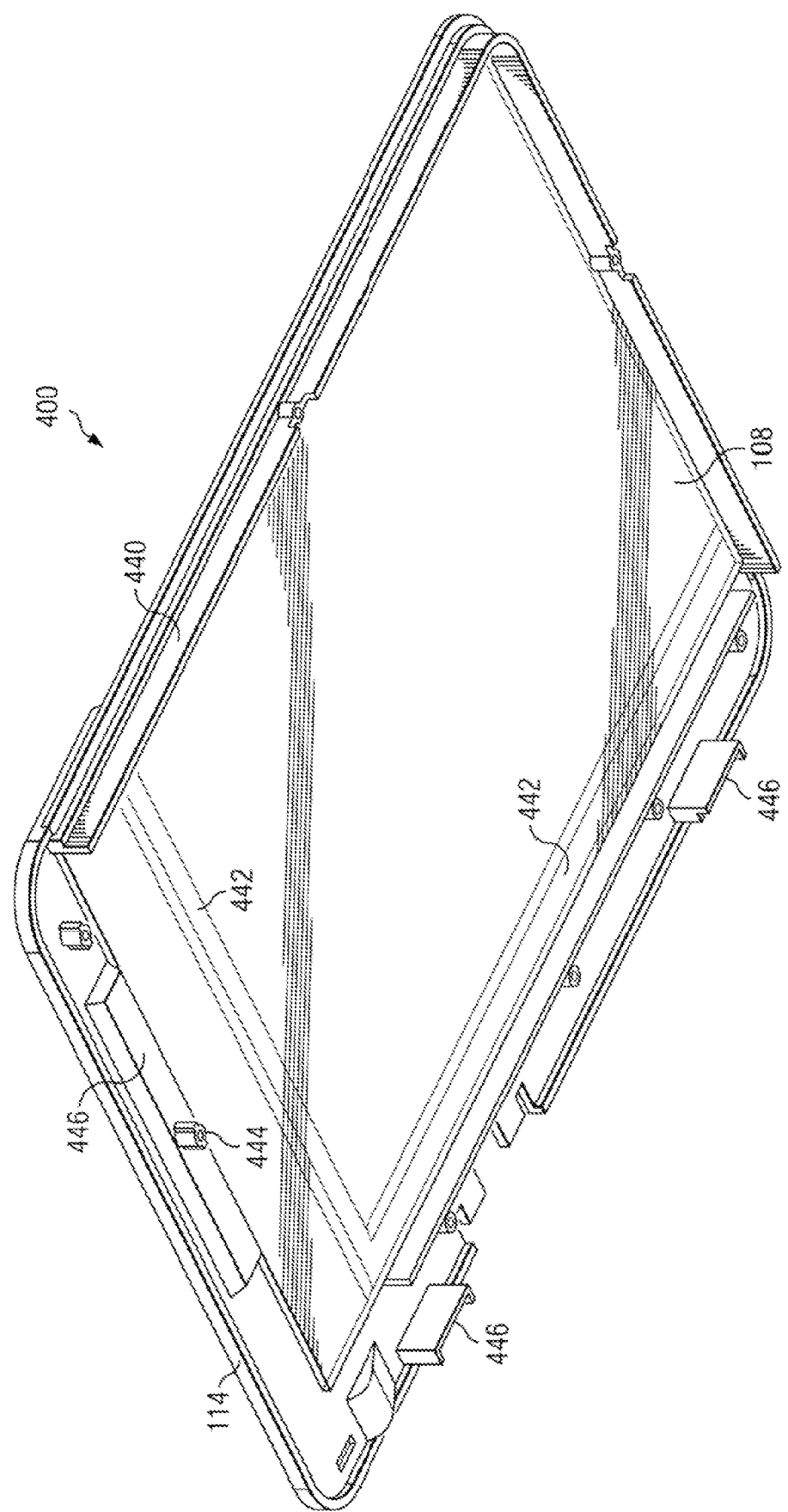
FIG. 4 is an isometric bottom view of a top bezel assembly 400 in an example embodiment of the invention.

FIG. 4 is an isometric bottom view of top bezel assembly 400 in an example embodiment of the invention. Top bezel assembly 400 comprises top bezel 114, platen 108, and support frame 440. The bottom surface of top bezel 114 is attached to the top surface of platen 108 along the right and back sides of platen 108. Typically double sided tape is used to attach the top bezel 114 to the platen 108 along sections 442 and 444, however epoxy, glue or the like could be used instead. In some examples clips may also be used to hold top bezel 114 to platen 108. Support frame 440 is attached to the bottom surface of platen along the left side and front side, typically using double sided tape.

Alignment features 446 on the bottom side of top bezel and support frame 440, fit inside base 106 (see FIG. 2) and align top bezel assembly 400 to base 106. One or more screws may be used to attach top bezel 114 to base 106 along the back and right side of top bezel 114. The screws may be attached to the top bezel 114 through the bottom of base 106 to preserve a clean look to the top side of the bottom section of scanner 100.

Figure 5:
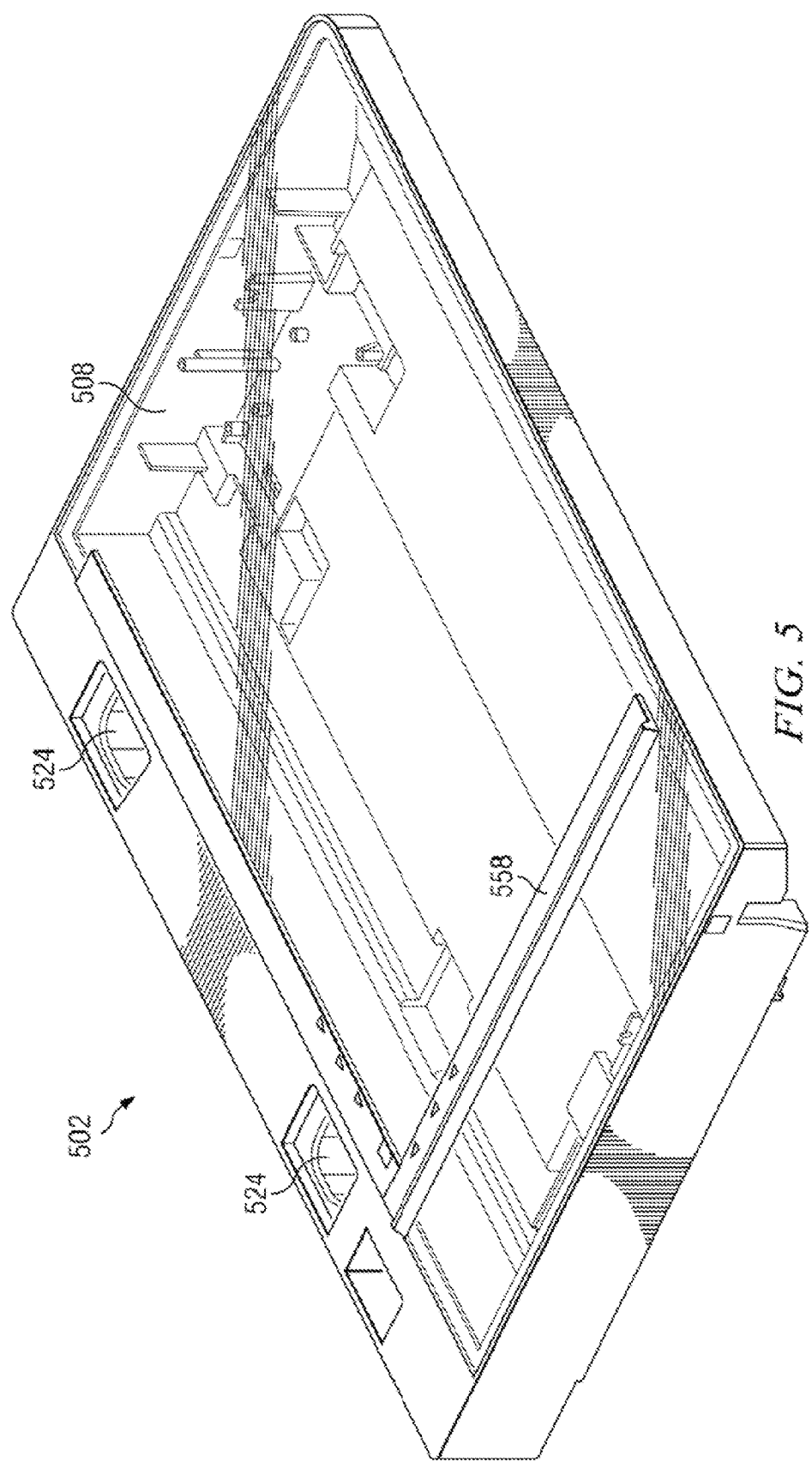
FIG. 5 is an isometric top view of the bottom section 502 of a scanner in another example embodiment of the invention.

FIG. 5 is an isometric top view of the bottom section 502 of a scanner in another example embodiment of the invention. In this example, there is no top bezel. Bottom section 502 comprises base 506, platen 508, and flatbed datum 558. Base 506 is a generally rectangular open topped box forming a cavity. Base 506 may include mounting features 524 for an ADF or top cover. Base 506 is typically a molded plastic part. Platen 508 is generally a thin rectangular sheet or plate and is made from a transparent material, for example glass or Plexiglas. The bottom surface of platen 508, around its edges, attaches to the top of base 506, typically using double sided tape. Platen 108 seals off the cavity in base 106. In other examples, a support frame may be attached to the bottom surface of platen (see FIG. 4) and the support frame may be attached to the base.

Flatbed datum 558 attaches to the top surface of platen 508 using epoxy, glue, double sided tape, or the like. Flatbed datum is used to position media on platen 508 in preparation for a scan. The top surface of platen 508 is the highest part of, and forms the top surface of, the bottom section 502 of the scanner, except where the flatbed datum 558 is attached. Because the top surfaces of platen 108 are uncovered except where the flatbed datum 558 is located, media can be removed from the scanner by sliding the media directly off the platen 508 away from the flatbed datum 558.

Bottom section 502 may also comprise an optical head or carriage, a drive system to move the carriage in a scanning axis, electronics to control the scanner, and the like. These items are not shown for clarity.

Figures 6A, 6B, 6C:
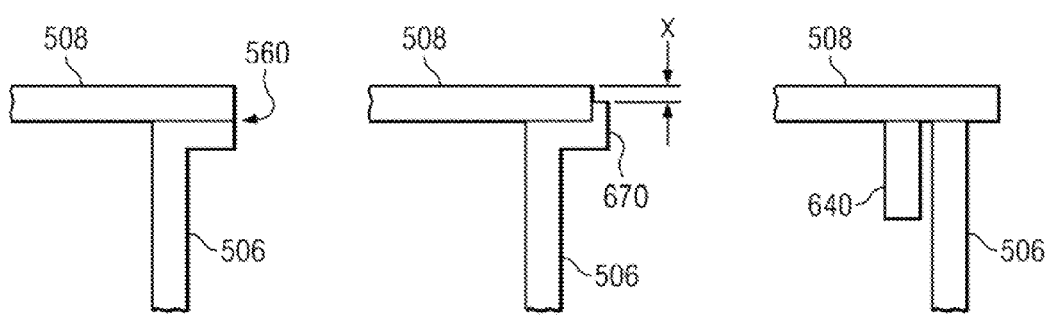
FIG. 6A-6C are sectional side views showing where the platen is attached to the top of a base in an example embodiment of the invention.

FIG. 6A-6C are sectional side views of where the platen is attached to the top of base in an example embodiment of the invention. In FIG. 6A a side wall of base 506 is shown forming a ledge. The edge of platen 508 is attached to the ledge using epoxy or double sided tape in gap 560. The edge of the platen is shown aligned with the edge of the ledge, but in other examples the edge of the platen 508 may extend beyond the edge of the ledge.

In FIG. 6B a side wall of base 506 is shown forming a ledge with a lip 670. Lip 670 may be used to help align platen on top of base 506. The top of lip 670 is shown below the top surface of platen 508 by distance X. In other examples the top surface of lip 670 may be the same height as the top surface of platen 506.

In FIG. 6C support frame 640 is shown attached to the bottom surface of platen 508. Support frame may be used to align the edge of platen 508 to the side wall of base 506. Platen 506 may be attached to the top of base 506 using glue, epoxy, double sided tape, or the like.

FIG. 7 is an isometric bottom view of platen 508 in an example embodiment of the invention. Platen 508 may have a border 774 printed on the bottom surface of platen. A calibration strip 772 may also be printed on the bottom surface of platen 508.

The examples describe above showed two edges of the platen as the top surface of the bottom section of a scanner. In those examples, media can be removed from the platen by sliding the media in a diagonal direction off the platen. In other examples, only one edge of the platen may be uncovered and form the top surface of the scanner. For example, only the front edge or only one side edge may be uncovered. In these examples, media could be removed from the platen by sliding the media directly sideways or backwards of the platen.

The examples describe above also show the scanner as a standalone scanner. In other examples, the scanner may be incorporated into a FAX machine, a copier, or an MFP.

What is claimed is:

1. A scanner, comprising:
   a bottom section of the scanner comprising:
      a generally rectangular base forming a generally rectangular cavity with an open top, the base having a front side, and a back side opposite the front side;
      the base having a left side, and a right side opposite the left side, where the right side is generally perpendicular to the front side;
      a top bezel assembly comprising:
         a platen made from a transparent material and forming a generally rectangular plate, the platen having a top surface and bottom surface;
         a bezel on the platen;
      wherein the top bezel assembly is attached to the top of the base and covers the cavity, and
      wherein a portion of the bezel divides the platen into two sections comprising a flatbed window and an Automatic Document Feeder (ADF) window.

2. The scanner of claim 1, wherein the one side of the bottom section is the front side.

3. The scanner of claim 1, wherein the one side of the bottom section is adjacent to the front side.

4. The scanner of claim 1, wherein the top surface of the platen forms the top surface of the bottom section along a portion of both the front side and a side of the base adjacent to the front side.

5. The scanner of claim 4, further comprising:
   a top cover, wherein the top cover is attached to the top side of the base proximate the back side of the base;
   the top cover having an open position and a closed position, wherein in the closed position a bottom surface of the top cover contacts the top surface of the platen thereby holding any media placed on the platen in place during a scan.

6. The scanner of claim 4, further comprising:
   an automatic document feeder (ADF), wherein the ADF is attached to the top side of the base proximate the back side of the base; and
   where the ADF has an open position and a closed position, a bottom of the ADF resting on at least a portion of a top side of the bezel in the closed position.

7. The scanner of claim 1, wherein the scanner is part of one of the following list of devices comprising: a copier, and a multi-function peripheral (MFP).

8. The scanner of claim 1, wherein a border and a calibration strip are printed on the bottom surface of the platen.

9. A scanner bottom section, comprising:
   a generally rectangular base forming a generally rectangular cavity with an open top; and
   a platen made from a transparent material and forming a generally rectangular plate having 4 edges;
   the platen having a top surface and a bottom surface, the bottom surface attached to the top of the base around the periphery of the cavity;
   wherein the top surface of at least one of the 4 edges of the platen is uncovered; and wherein a border and a calibration strip are printed on the bottom surface of the platen.

10. The scanner bottom section of claim 9, further comprising;
a top datum attached to the top side of the platen.

11. The scanner bottom section of claim 9, wherein the platen is attached to the base using a support frame attached to the bottom side of the platen.

12. The scanner bottom section of claim 9, wherein the uncovered edge of the platen extends beyond the edge of the base.

13. The scanner bottom section of claim 9, wherein two of the 4 edges are uncovered, and where the two edges are adjacent.

14. The scanner of claim 1, wherein the portion of the bezel that divides the platen into two sections further comprises an edge sloped toward the ADF window to form an ADF paper path ramp.

15. The scanner of claim 14, wherein the portion of the bezel that divides the platen into two sections further comprises a flatbed datum arranged opposite the ADF paper path ramp.

16. The scanner of claim 1, wherein the portion of the bezel that divides the platen into two sections is adhered to an upper surface of the platen, the platen being a single sheet of material.

17. The scanner of claim 16, wherein the portion of the bezel that divides the platen into two sections is adhered to an upper surface of the platen by double-sided tape.

18. The scanner of claim 16, wherein the portion of the bezel that divides the platen into two sections is adhered to an upper surface of the platen by glue or epoxy.

19. A scanner bottom section, comprising:

a generally rectangular base forming a generally rectangular cavity with an open top;

a platen made from a transparent material and forming a generally rectangular plate having 4 edges;

the platen having a top surface and a bottom surface, the bottom surface attached to the top of the base around the periphery of the cavity;

wherein the top surface of at least one of the 4 edges of the platen is uncovered; and a bezel, wherein a portion of the bezel divides the platen into two sections and is adhered to an upper surface of the platen, the platen being a single sheet of material.

* * * * *